US008991688B1

(12) United States Patent
Daboub et al.

(10) Patent No.: US 8,991,688 B1
(45) Date of Patent: Mar. 31, 2015

(54) SYSTEM AND METHOD FOR PROVIDING GOODS, SERVICES OR INFORMATION USING SCANNABLE CODE

(71) Applicant: American Airlines, Inc., Fort Worth, TX (US)

(72) Inventors: Joseph A. Daboub, Euless, TX (US); Rajiv Rodrigues, Ft. Worth, TX (US)

(73) Assignee: American Airlines, Inc., Fort Worth, TX (US)

( * ) Notice: Subject to any disclaimer, the term of this patent is extended or adjusted under 35 U.S.C. 154(b) by 36 days.

(21) Appl. No.: 13/744,597

(22) Filed: Jan. 18, 2013

(51) Int. Cl.
G06F 17/00 (2006.01)
G06F 17/30 (2006.01)

(52) U.S. Cl.
CPC .................................. *G06F 17/30* (2013.01)
USPC .......................................................... 235/375

(58) Field of Classification Search
CPC ..... G06Q 30/20; G06Q 10/87; G06Q 20/341; G06Q 20/20; G06Q 20/0457; G06Q 20/3276; G06Q 30/00; G07F 7/1008; G06K 17/10; G07G 1/0081
USPC .......................................................... 235/375
See application file for complete search history.

(56) References Cited

U.S. PATENT DOCUMENTS

| 2005/0269399 A1* | 12/2005 | Bensimon et al. ............. 235/380 |
| 2009/0303036 A1* | 12/2009 | Sahuguet ................. 340/539.13 |
| 2012/0118953 A1* | 5/2012 | Diamond ....................... 235/380 |
| 2013/0110682 A1* | 5/2013 | Rosenblatt et al. .......... 705/27.1 |

* cited by examiner

*Primary Examiner* — Thien M Le
*Assistant Examiner* — Asifa Habib
(74) *Attorney, Agent, or Firm* — Haynes and Boone, LLP (57) ABSTRACT

According to one aspect, a machine is located at a fixed location, and a scannable code is connected to the machine, the code indicating the fixed location and an application program having a user interface that is displayable on the machine. The code is scanned using a portable user device to generate first and second identifiers, the first and second identifiers identifying the fixed location and the application program, respectively. The first and second identifiers are transmitted from the portable user device to one or more remotely-located servers. User interface instructions are transmitted from the one or more remotely-located servers to the machine, the user interface instructions being associated with the display of the user interface on the machine and based on at least the application program. In several exemplary embodiments, the user interface may be associated with a commercial airline environment.

22 Claims, 4 Drawing Sheets

SYSTEM AND METHOD FOR PROVIDING GOODS, SERVICES OR INFORMATION USING SCANNABLE CODE

BACKGROUND

The present disclosure relates in general to providing goods, services or information using a code such as, for example, a scannable matrix bar code. A scannable code is often used to communicate a code to a scanning device such as, for example, a smartphone. The image of the code is scanned by the scanning device in order to display text, provide contact information, connect to a wireless network, or open a web page in the browser of the smartphone. This type of one-way communication is not able to provide customized experiences during which information, goods or services are provided. Such customized experiences may be helpful in a wide variety of environments or scenarios such as, for example, commercial airline environments or scenarios. Therefore, what is needed is a method, system or apparatus that addresses this issue, among others.

DETAILED DESCRIPTION

Figure 1:
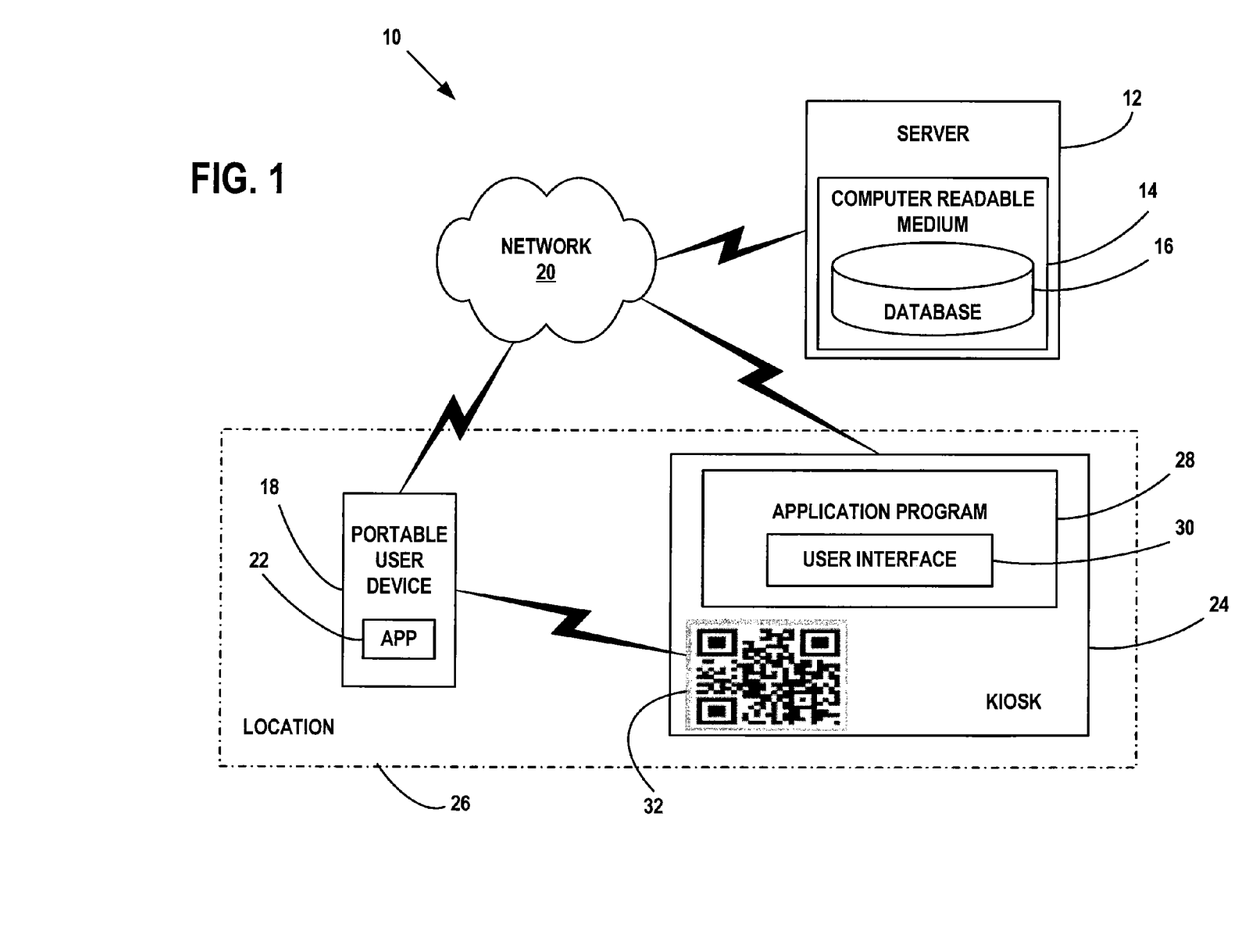
FIG. 1 is a diagrammatic illustration of a system according to an exemplary embodiment.

In an exemplary embodiment, as illustrated in FIG. 1, a system is generally referred to by the reference numeral 10 and includes a server 12, which includes a computer readable medium 14. Instructions accessible to, and executable by, the server 12 are stored on the computer readable medium 14. A database 16 is also stored on the computer readable medium 14. A portable user device 18 is operably coupled to, and in communication with, the server 12 via a network 20. A mobile application (or "app") 22 is stored on the portable user device 18. A machine, such as a kiosk 24, is located at a fixed location 26. The kiosk 24 is operably coupled to, and in communication with, the server 12 via the network 20. An application program 28 is stored on the kiosk 24. The application program 28 has a user interface 30 that is displayable on the kiosk 24. A scannable code 32 is connected to the kiosk 24 and thus is also located at the fixed location 26. In an exemplary embodiment, the scannable code 32 is a matrix bar code. In an exemplary embodiment, the scannable code 32 is a QR Code. In an exemplary embodiment, the scannable code 32 is connected to the kiosk 24 by being part of the user interface 30. In an exemplary embodiment, the scannable code 32 may be located at the fixed location 26, but disconnected from the kiosk 24. For example, the scannable code 32 may be part of a sign that is proximate the kiosk 24 at the fixed location 26.

In an exemplary embodiment, the server 12 is a web application server, which in several exemplary embodiments includes and/or executes one or more web-based programs, Intranet-based programs, and/or any combination thereof. In an exemplary embodiment, the network 20 includes the Internet, one or more local area networks, one or more wide area networks, one or more cellular networks, one or more wireless networks, one or more voice networks, one or more data networks, one or more communication systems, and/or any combination thereof.

In an exemplary embodiment, the portable user device 18 is a handheld or otherwise portable user device which is carried by a user who is a customer of, for example, a commercial airline. In several exemplary embodiments, the portable user device 18 is a smartphone such as, for example, an iPhone® by Apple Inc. The portable user device 18 includes a computer readable medium in which the application 22 is stored, and a processor that executes the application 22. The portable user device 18 is capable of scanning or reading the scannable code 32. In an exemplary embodiment, the portable user device 18 includes a scanner or bar code reader, the operation of which is controlled using the application 22. In an exemplary embodiment, the portable user device 18 includes a camera that is able to capture still photographs and/or video of the scannable code 32, and the application 22 is a code reader application that scans or reads the code 32 using the camera. As shown in FIG. 1, under conditions to be described below, the portable user device 18 may be moved to the fixed location 26 so that it is at least temporarily located at the fixed location 26.

In an exemplary embodiment, the kiosk 24 includes a computer readable medium on which the application program 28 is stored; a processor that executes the application program 28; one or more output devices on which the user interface 30 is displayed, such output devices may include a multi-touch screen, touchpad, one or more graphical displays, and/or any combination thereof; and one or more input devices via which the user may interact with the kiosk 24 and the user interface 30 such as, for example, keyboards, buttons, touchpads, etc. In an exemplary embodiment, instead of the kiosk 24, the application program 28 is stored on another type of machine located at the fixed location 26 such as, for example, a vending machine, a digital sign, a computer terminal, or any other type of computing device.

In several exemplary embodiments, at least one of the application 22 and the application program 28 includes a computer program including a plurality of instructions, data, and/or any combination thereof. In an exemplary embodiment, the application program 22 is an application written in, for example, HyperText Markup Language (HTML), Cascading Style Sheets (CSS), JavaScript, Extensible Markup Language (XML), asynchronous JavaScript and XML (Ajax), and/or any combination thereof. In an exemplary embodiment, at least one of the application 22 and the application program 28 is a web-based application written in, for example, Java or Adobe Flex, which pulls real-time information from the server 12, automatically refreshing with latest information every, for example, 45 seconds. In an exemplary embodiment, at least one of the portable user device 18 and the kiosk 24 is a thin client and the server 12 controls at least a portion of the operation of the portable user device 18 and/or the kiosk 24. In an exemplary embodiment, at least one of the portable user device 18 and the kiosk 24 is a thick client, and/or functions as both a thin client and a thick client.

In several exemplary embodiments, one or more of the components of the system 10 and/or content stored therein, and/or any combination thereof, are part of, and/or are distributed throughout, the system 10 and/or one or more other components thereof. In several exemplary embodiments, the platforms of the system 10 are identical, different, or vary with respect to equipment, peripherals, hardware architecture and/or specifications, software architecture and/or specifications, and/or any combination thereof.

Figure 2:
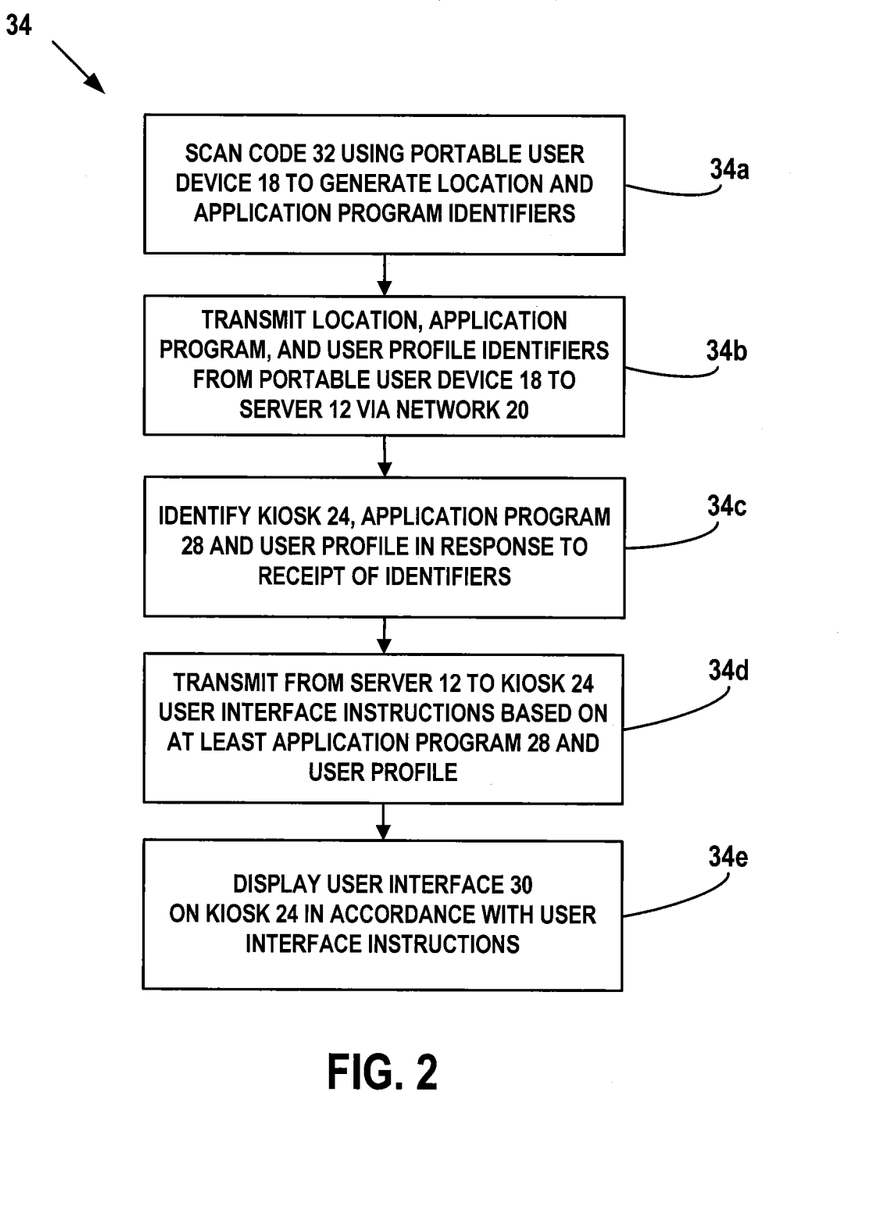
FIG. 2 is a flow chart illustration of a method of operating the system of FIG. 1, according to an exemplary embodiment.

In an exemplary embodiment, as illustrated in FIG. 2 with continuing reference to FIG. 1, a method of operating the system 10 is generally referred to by the reference numeral 34. The method 34 includes at step 34a scanning the code 32 using the portable user device 18 to generate a location identifier that identifies the fixed location 26, as well as an application program identifier that identifies the application program 28. In an exemplary embodiment, at the step 34a, a user of the portable user device 18, such as an airline passenger, walks to the fixed location 26 and then places the portable user device 18 proximate the code 32 to thereby scan the code 32. Each of the location and application program identifiers generated at the step 34a includes any type of computer data, information, software, tag(s), string(s), electronic code(s), number(s), character string(s), and/or any combination thereof. In an exemplary embodiment, the location and application program identifiers generated at the step 34a may be a single identifier that identifies the fixed location 26 and the application program 28.

In an exemplary embodiment, the application 22 detects whether a user profile identifier associated with the portable user device 18 and thus the user profile thereof exists. This user profile identifier may be stored on the computer readable medium of the portable user device 18. In an exemplary embodiment, the user profile identifier is assigned and stored on the portable user device 18 during the operation of the server 12 and its communication with the portable user device 18 via the network 20. In an exemplary embodiment, the user profile identifier is assigned and stored on the portable user device 18 in response to the user using the application 22 to enroll in a club or program maintained by the commercial airline, such as a frequent flyer program, thereby opening a frequent flyer account. In an exemplary embodiment, the user profile identifier is assigned and stored on the portable user device 18 in response to the user using the application 22 to initially login into the frequent flyer program and access his or her frequent flyer account. In an exemplary embodiment, the user profile identifier is a frequent flyer number. In an exemplary embodiment, the user profile identifier includes one or more name-value pairs, one of which is a user identification (user ID).

At step 34b the location, application program, and user profile identifiers are transmitted from the portable user device 18 to the server 12 via the network 20. At step 34c the server 12 identifies the kiosk 24, the application program 28, and the user profile associated with the portable user device 18, in response to the receipt of the identifiers at the step 34b. Based on these identifications, at step 34d the server 12 generates, processes, and/or selects user interface instructions, and transmits the user interface instructions to the kiosk 24 via the network 20. The server 12 transmits the user interface instructions to the kiosk 24 because the kiosk 24 has been identified as the correct destination in response to the receipt of the location identifier at the step 34b. The user interface instructions transmitted at the step 34d are associated with the display of the user interface 30 on the kiosk 24 and are based on at least the application program 28 and the user profile associated with the portable user device 18. At step 34e the application program 28 displays the user interface 30 on the kiosk 24 in accordance with the user interface instructions. As a result, the display of the user interface 30 on the kiosk 24 is customized to the application program 28 and the user profile associated with the portable user device 18. The user of the portable user device 18 may then make selections or interact with the user interface 30 using, for example, one or more of the input devices that are part of the kiosk 24. In several exemplary embodiments, the display of the user interface 30 may be directed to the purchase of goods and/or services, the provision of timely and relevant information to the user, and/or any combination thereof.

In an exemplary embodiment, the display of the user interface 30 includes a greeting to the user of the portable user device 18, such as "Welcome Mr. John Smith! Thank you for flying to Chicago today. In the past you've purchase drinks or snacks before flights. Would you like to purchase any drinks or snacks for your flight today?"

In an exemplary embodiment, the display of the user interface 30 includes a greeting to the user of the portable user device 18, as well as relevant information, such as "Welcome Maya! We aim to make your journey enjoyable! You will be boarding Flight 251 from Gate A27 departing in 3 hours 45 minutes to Chicago O'Hare Airport. You can: (a) relax at the Club near Gate A25; (b) grab a bite at the Food Court near Gate A24; and (c) shop for golf equipment at Sports, Inc. near Gate A27." The display of the user interface 30 can also include one or more maps showing where the user of the portable user device 18 (or the kiosk 24) is located, and where the different gates noted in the foregoing greeting are located.

In several exemplary embodiments, during the operation of the system 10, and/or the execution of the method 34, the scanning of the code 32 triggers different services to, for example, customers of a commercial airline, and/or agents or employees of the commercial airline. The customer or agent initiates a service by scanning the code 32 using the portable user device 18. The code 32 identifies the fixed location 26 and the application program 28. In response to the scanning, the location, application program, and user profile identifiers are sent to the server 12, which invokes the required backend functionality and routes an appropriate response to the kiosk 24 at the fixed location 26. The application program 28 processes this response and customizes the user interface 30 and thus the options presented to the user who is present at the kiosk 24.

In several exemplary embodiments, the operation of the system 10, and/or the execution of the method 34, may occur or be used in many different environments or scenarios. For example, the user of the portable user device 18 is a customer of, and/or passenger on, a commercial airline. The fixed location 26 is a particular location in an airport, the machine is a digital sign (instead of the kiosk 24), and the code 32 is a QR Code connected to the digital sign. The user scans the code 32 using the portable user device 18 and the application 20. The user identifier, location identifier, and application program identifier are transmitted from the portable user device 18 to the server 12 via the network 20. The server 12 transmits user interface instructions to the digital sign via the network 20. As a result, the display of the user interface 30 provides information to the user regarding how to get to his or her gate from the fixed location 26, and/or regarding the availability of venues and services from the fixed location 26.

In another exemplary embodiment, kiosk 24 is a self-service check-in machine, and the user of the portable user device 18 is an agent assisting with a validation of a customer's passport or visa information on the kiosk 24. When such a validation is needed, the agent scans the code 32 on the kiosk 24. The portable user device 18 then communicates with the server 12, which communicates back to the kiosk 24 to proceed forward with the document validation.

In another exemplary embodiment, the user of the portable user device 18 is a customer of a commercial airline. The fixed location 26 is a gate at an airport, the machine is a vending machine (instead of the kiosk 24), and the code 32 is a QR Code connected to the vending machine. The user scans the code 32 using the portable user device 18 and the application 20 in order to purchase products from the vending machine before boarding an airline flight at the gate. The user interface 30 is customized, and thus the options presented to the user are customized, based on different factors such as, for example, the user's history, tier level, itinerary, frequent flyer miles accrued, and/or any combination thereof. These factors are retrieved and routed to the vending machine by the server 12 as a result of the scan of the code 32. In an exemplary embodiment, during the subsequent airline flight, a flight attendant delivers the purchased products to the user, who is seated on the airplane.

In several exemplary embodiments, the operation of the system 10, and/or the execution of the method 34, minimizes the amount of input necessary by the user of the portable user device 18, recognizes different fixed locations 26 of the user throughout his or her journey, and as desired can provide the user with a customized/personalized experience at the different fixed locations 26 throughout the journey such as, for example, curb side at an airport, at a ticket counter at the airport, at a gate at the airport, at an admirals club at the airport, on an airplane in flight, and at a bag pickup area at another airport.

In several exemplary embodiments, the operation of the system 10, and/or the execution of the method 34, triggers proprietary services which can be customized and adapted to a specific customer based on his or her initial interaction with the application program 28 using the portable user device 18, the application 20, and the code 32.

In several exemplary embodiments, the operation of the system 10, and/or the execution of the method 34, provides two-way communication from the kiosk 24 to the portable user device 18 using the code 32, and back from the portable user device 18 to the kiosk 24 using the network 20 and the server 12.

In several exemplary embodiments, the user interface 30 may offer goods and/or services such as, for example, food options (Chinese, Italian, Mexican, Indian, American, etc.); entertainment services such as movies and TV episodes, sports programming (tennis, basketball, cricket, etc.); apparel and jewelry; and airline-related deals such as, for example, one day passes, upgrades, ticket purchases, etc.

Figure 3:
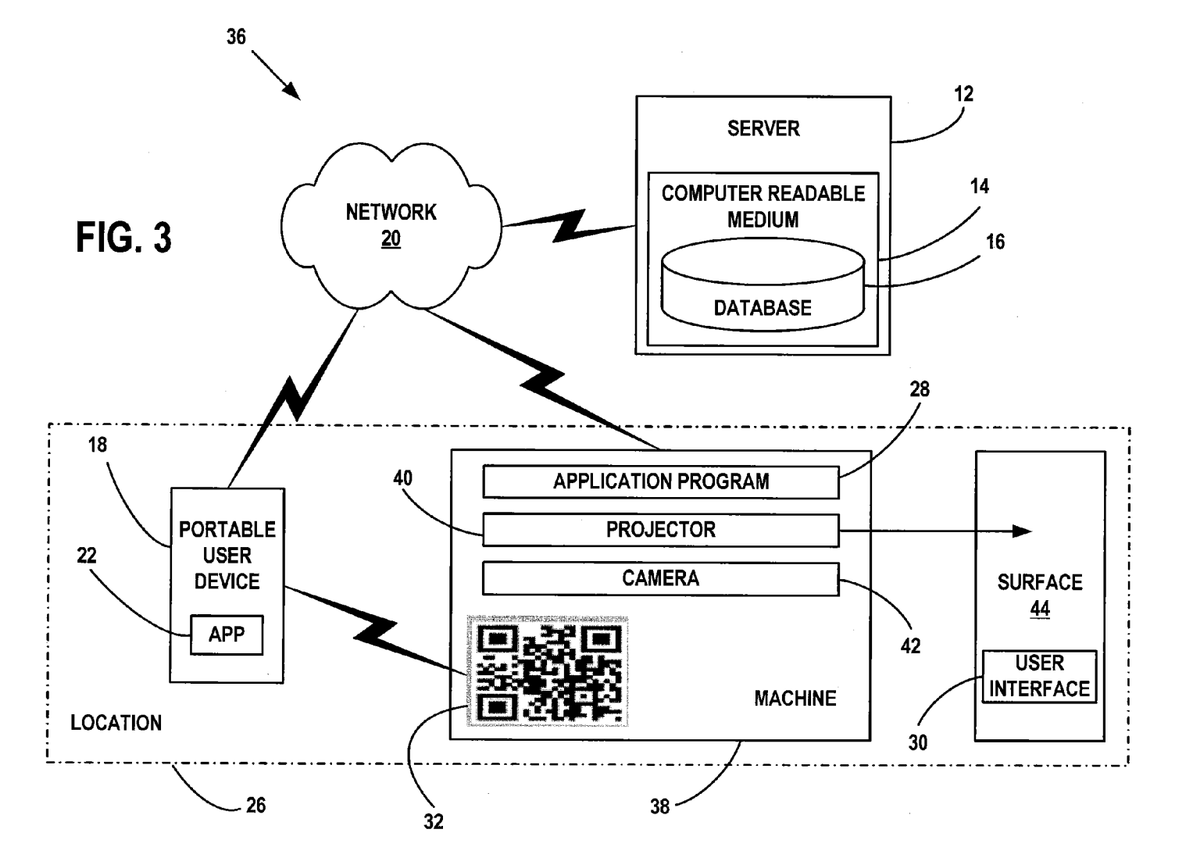
FIG. 3 is a diagrammatic illustration of a system according to an exemplary embodiment.

In an exemplary embodiment, as illustrated in FIG. 3 with continuing reference to FIGS. 1 and 2, a system is generally referred to by the reference numeral 36 and includes several of the components of the system 10, which components are given the same reference numerals. As shown in FIG. 3, instead of the kiosk 24, the system includes a machine 38 to which the code 32 is connected. The machine 38 includes a projector 40 and a camera 42. The projector 40 is adapted to display the user interface 30 on a surface 44. The camera 42 is a motion sensing input device that can interpret gestures by humans. In several exemplary embodiments, the surface 44 is a wall surface or a display screen. The operation of the system 36 is identical to the above-described operation of the system 10, except for the manner in which the user of the portable user device 18 interacts with the machine 38. Instead of displaying the user interface 30 on the machine 38, the projector 40 projects and thus displays the user interface 30 on the surface 44. Instead of receiving inputs using input devices that are part of the machine 38, the camera 42 detects and identifies motions by the user of the portable user device 18 who is viewing the user interface 30 on the surface 44, thereby receiving inputs from the user.

Figure 4:
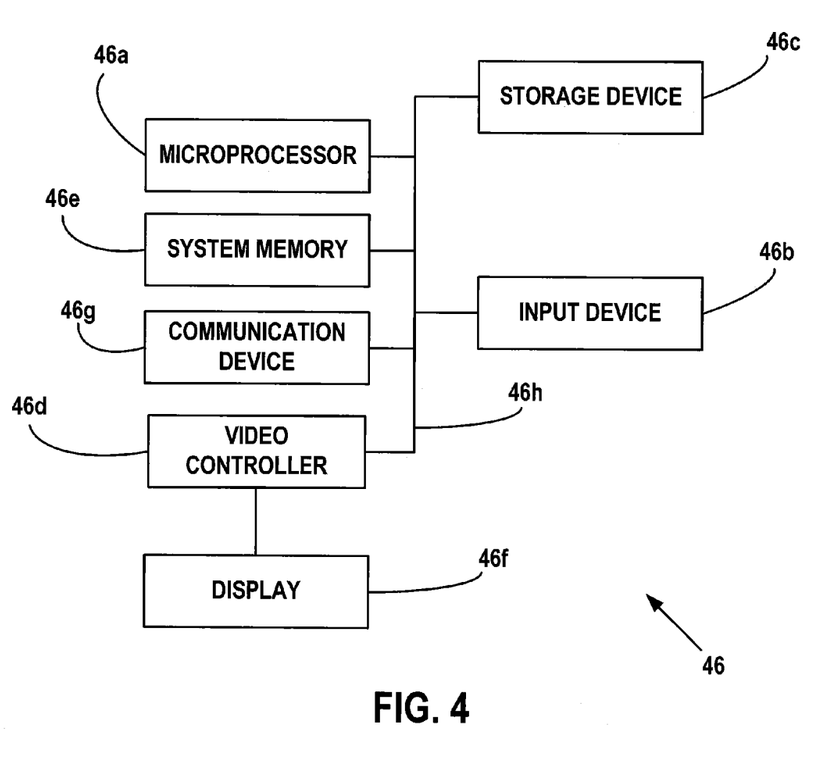
FIG. 4 is a diagrammatic illustration of a node for implementing one or more exemplary embodiments of the present disclosure, according to an exemplary embodiment.

In an exemplary embodiment, as illustrated in FIG. 4 with continuing reference to FIGS. 1-3, an illustrative node 46 for implementing one or more embodiments of one or more of the above-described networks, elements, methods and/or steps, and/or any combination thereof, is depicted. The node 46 includes a microprocessor 46a, an input device 46b, a storage device 46c, a video controller 46d, a system memory 46e, a display 46f, and a communication device 46g all interconnected by one or more buses 46h. In several exemplary embodiments, the storage device 46c may include a floppy drive, hard drive, CD-ROM, optical drive, any other form of storage device and/or any combination thereof. In several exemplary embodiments, the storage device 46c may include, and/or be capable of receiving, a floppy disk, CD-ROM, DVD-ROM, or any other form of computer-readable medium that may contain executable instructions. In several exemplary embodiments, the communication device 46g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the components of the system 10 or 36, such as one or more of the server 12, the portable user device 18, the kiosk 24 and the machine 38, include at least the node 46 and/or components thereof, and/or one or more nodes that are substantially similar to the node 46 and/or components thereof. In several exemplary embodiments, one or more of the above-described components of the node 46 and/or the system 10 include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof, may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a computer readable medium may be executed by one or more processors to cause the one or more processors to carry out or implement in whole or in part the above-described operation of each of the above-described exemplary embodiments of the system 10, the method 34, the system 36, and/or any combination thereof. In several exemplary embodiments, such a processor may include one or more of the microprocessor 46a, any processor(s) that are part of the components of the system 10 or 36, and/or any combination thereof, and such a computer readable medium may be distributed among one or more components of the system 10 or 36. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

A method has been described that includes locating a machine at a fixed location; connecting a scannable code to the machine, the code indicating the fixed location and an application program having a user interface that is displayable on the machine; scanning the code using a portable user device to generate first and second identifiers, the first and second identifiers identifying the fixed location and the application program, respectively; transmitting the first and second identifiers from the portable user device to one or more remotely-located servers; identifying, using the one or more remotely-located servers, the machine and the application program in response to the receipt of the first and second identifiers by the one or more remotely-located servers; transmitting user interface instructions from the one or more remotely-located servers to the machine, the user interface instructions being associated with the display of the user interface on the machine and based on at least the application program; and displaying the user interface on the machine in accordance with the user interface instructions. In an exemplary embodiment, the method includes transmitting a third identifier from the portable user device to the one or more remotely-located servers, the third identifier identifying a user profile, the user profile being associated with the portable user device; wherein the user interface instructions are based on at least the application program and the user profile so that the display of the user interface on the machine is customized. In an exemplary embodiment, the portable user device is selected from the group consisting of a scanner, a reader, and a smartphone; and wherein the machine is selected from the group consisting of a kiosk, a vending machine, and a digital sign.

A method has been described that includes receiving, using at least one computer system, a first identifier associated with a fixed location of a machine, and a second identifier associated with an application program having a user interface displayable at the fixed location, wherein the first and second identifiers are received from a source other than the machine; identifying, using the at least one computer system, the machine and the application program in response to receiving the first and second identifiers; and transmitting, using the at least one computer system, user interface instructions to the machine, the user interface instructions being associated with the display of the user interface on the machine and based on at least the application program. In an exemplary embodiment, the source is a portable user device, and the first and second identifiers are received in response to a scan of a code located at the fixed location by the portable user device. In an exemplary embodiment, the code is connected to the machine. In an exemplary embodiment, the code is a matrix bar code. In an exemplary embodiment, the method includes displaying the user interface on the machine in accordance with the user interface instructions. In an exemplary embodiment, the machine is selected from the group consisting of a kiosk, a vending machine, and a digital sign. In an exemplary embodiment, the machine includes a projector; and wherein the method further including displaying the user interface on a surface using the projector. In an exemplary embodiment, the user interface instructions are transmitted to the machine from a remote location that is different from the fixed location. In an exemplary embodiment, the method includes receiving a third identifier associated with a user profile; identifying the user profile in response to receiving the third identifier; and displaying the user interface at the fixed location in accordance with the user interface instructions; wherein the user interface instructions are based on at least the application program and the user profile so that the display of the user interface is customized.

An apparatus has been described that includes a non-transitory computer readable medium; and a plurality of instructions stored on the non-transitory computer readable medium and executable by one or more processors, the plurality of instructions including instructions that cause the one or more processors to receive a first identifier associated with a fixed location of a machine, and a second identifier associated with an application program having a user interface displayable at the fixed location, wherein the first and second identifiers are received from a source other than the machine; instructions that cause the one or more processors to identify the machine and the application program in response to receiving the first and second identifiers; and instructions that cause the one or more processors to transmit user interface instructions to the machine, the user interface instructions being associated with the display of the user interface on the machine and based on at least the application program. In an exemplary embodiment, the source is a portable user device, and the first and second identifiers are received in response to a scan of a code located at the fixed location by the portable user device. In an exemplary embodiment, the code is a matrix bar code. In an exemplary embodiment, the plurality of instructions further includes instructions that cause the one or more processors to display the user interface on the machine in accordance with the user interface instructions. In an exemplary embodiment, the machine includes a projector; and wherein the plurality of instructions further includes instructions that cause the one or more processors to display the user interface on a surface using the projector. In an exemplary embodiment, the user interface instructions are transmitted to the machine from a remote location that is different from the fixed location. In an exemplary embodiment, the plurality of instructions further includes instructions that cause the one or more processors to receive a third identifier associated with a user profile; instructions that cause the one or more processors to identify the user profile in response to receiving the third identifier; and instructions that cause the one or more processors to display the user interface at the fixed location in accordance with the user interface instructions; wherein the user interface instructions are based on at least the application program and the user profile so that the display of the user interface is customized.

A system has been described that includes a machine located at a fixed location; an application program having a user interface displayable at the fixed location; a scannable code located at the fixed location, the code indicating the fixed location and the application program; and at least one computer system in communication with the machine, wherein the at least one computer system transmits user interface instructions to the machine in response to receiving first and second identifiers from a portable user device that is adapted to scan the code, the first and second identifiers being generated in response to the scanning of the code by the portable user device, the first and second identifiers identifying the fixed location and the application program, respectively. In an exemplary embodiment, the code is a matrix barcode. In an exemplary embodiment, the application program is executable on the machine, and the user interface is displayable on the machine. In an exemplary embodiment, the application program is executable on the machine, the machine includes a projector, and the user interface is displayed at the fixed location using the projector. In an exemplary embodiment, the at least one computer system transmits user interface instructions to the machine in response to receiving the first identifier, the second identifier, and a third identifier from the portable user device, the first, second and third identifiers identifying the fixed location, the application program, and a user profile associated with portable user device, respectively. In an exemplary embodiment, the system includes the portable user device.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. A method comprising:

locating a machine at a fixed location;

connecting a scannable code to the machine, the code indicating the fixed location and an application program having a user interface that is displayable on the machine;

scanning the code using a portable user device to generate first and second identifiers, the first and second identifiers identifying the fixed location and the application program, respectively;

transmitting the first and second identifiers from the portable user device to one or more remotely-located servers;

identifying, using the one or more remotely-located servers, the machine and the application program in response to the receipt of the first and second identifiers by the one or more remotely-located servers;

transmitting user interface instructions from the one or more remotely-located servers to the machine, the user interface instructions being associated with the display of the user interface on the machine and based on at least the application program and the fixed location of the machine; and displaying the user interface on the machine in accordance with the user interface instructions;

wherein the one or more remotely-located servers generate, process, or select the user interface instructions based on at least the fixed location of the machine and cause the user interface to be displayed on the machine in accordance with the user interface instructions; and wherein, in accordance with the user interface instructions, the user interface is displayed on the machine in accordance with the user interface instructions based on at least the fixed location and displays on the machine at least one of the following:

a map that indicates the fixed location of the machine;

information regarding how to get from the fixed location of the machine to another location; and information regarding the availability of venues and services from, or in the vicinity of, the fixed location of the machine.

2. The method of claim 1, further comprising:

transmitting a third identifier from the portable user device to the one or more remotely-located servers, the third identifier identifying a user profile, the user profile being associated with the portable user device;

wherein the user interface instructions are based on at least the application program and the user profile so that the display of the user interface on the machine is customized.

3. The method of claim 1, wherein the portable user device is selected from the group consisting of a scanner, a reader, and a smartphone; and wherein the machine is selected from the group consisting of a kiosk, a vending machine, and a digital sign.

4. A method comprising:

receiving, using at least one computer system, a first identifier associated with a fixed location of a machine, and a second identifier associated with an application program having a user interface displayable at the fixed location, wherein the first and second identifiers are received from a source other than the machine;

identifying, using the at least one computer system, the machine and the application program in response to receiving the first and second identifiers; and transmitting, using the at least one computer system, user interface instructions to the machine so that the user interface is displayed on the machine in accordance with the user interface instructions, the user interface instructions being associated with the display of the user interface and based on at least the application program and the fixed location of the machine;

wherein, in accordance with the user interface instructions, the user interface is displayed on the machine in accordance with the user interface instructions based on at least the fixed location and displays on the machine at least one of the following:

a map that indicates the fixed location of the machine;

information regarding how to get from the fixed location of the machine to another location; and information regarding the availability of venues and services from, or in the vicinity of, the fixed location of the machine.

5. The method of claim 4, wherein the source is a portable user device, and the first and second identifiers are received in response to a scan of a code located at the fixed location by the portable user device.

6. The method of claim 5, wherein the code is connected to the machine.

7. The method of claim 5, wherein the code is a matrix bar code.

8. The method of claim 4, wherein the machine is selected from the group consisting of a kiosk, a vending machine, and a digital sign.

9. The method of claim 4, wherein the user interface instructions are transmitted to the machine from a remote location that is different from the fixed location.

10. The method of claim 4, further comprising:

receiving a third identifier associated with a user profile;

identifying the user profile in response to receiving the third identifier; and displaying the user interface at the fixed location in accordance with the user interface instructions;

wherein the user interface instructions are based on at least the application program and the user profile so that the display of the user interface is customized.

11. An apparatus comprising:

a non-transitory computer readable medium; and a plurality of instructions stored on the non-transitory computer readable medium and executable by one or more processors, the plurality of instructions comprising:

instructions that cause the one or more processors to receive a first identifier associated with a fixed location of a machine, and a second identifier associated with an application program having a user interface displayable at the fixed location, wherein the first and second identifiers are received from a source other than the machine;

instructions that cause the one or more processors to identify the machine and the application program in response to receiving the first and second identifiers; and instructions that cause the one or more processors to transmit user interface instructions to the machine so that the user interface is displayed on the machine in accordance with the user interface instructions, the user interface instructions being associated with the display of the user interface on the machine and based on at least the application program and the fixed location of the machine;

wherein the user interface instructions comprise instructions that cause the user interface to be displayed on the machine in accordance with the user interface instructions based on at least the fixed location and display on the machine at least one of the following: a map that indicates the fixed location of the machine; information regarding how to get from the fixed location of the machine to another location; and information regarding the availability of venues and services from, or in the vicinity of, the fixed location of the machine.

12. The apparatus of claim 11, wherein the source is a portable user device, and the first and second identifiers are received in response to a scan of a code located at the fixed location by the portable user device.

13. The apparatus of claim 12, wherein the code is a matrix bar code.

14. The apparatus of claim 11, wherein the user interface instructions are transmitted to the machine from a remote location that is different from the fixed location.

15. The apparatus of claim 11, wherein the plurality of instructions further comprises:
  instructions that cause the one or more processors to receive a third identifier associated with a user profile;
  instructions that cause the one or more processors to identify the user profile in response to receiving the third identifier; and
  instructions that cause the one or more processors to display the user interface at the fixed location in accordance with the user interface instructions;
  wherein the user interface instructions are based on at least the application program and the user profile so that the display of the user interface is customized.

16. The apparatus of claim 11, wherein the machine is selected from the group consisting of a kiosk, a vending machine, and a digital sign.

17. A system, comprising a machine located at a fixed location; an application program having a user interface displayable at the fixed location; a scannable code located at the fixed location, the code indicating the fixed location and the application program; and at least one computer system in communication with the machine, wherein the at least one computer system transmits user interface instructions to the machine in response to receiving first and second identifiers from a portable user device that is adapted to scan the code, the first and second identifiers being generated in response to the scanning of the code by the portable user device, the first and second identifiers identifying the fixed location and the application program, respectively;
  wherein the user interface instructions are associated with the display of the user interface and cause the user interface to be displayed on the machine in accordance with the user interface instructions;
  wherein the user interface instructions are based on at least the application program and the fixed location of the machine; and
  wherein, in accordance with the user interface instructions, the user interface is displayed on the machine in accordance with the user interface instructions based on at least the fixed location and displays on the machine at least one of the following:
    a map that indicates the fixed location of the machine;
    information regarding how to get from the fixed location of the machine to another location; and
    information regarding the availability of venues and services from, or in the vicinity of, the fixed location of the machine.

18. The system of claim 17, wherein the code is a matrix barcode.

19. The system of claim 17, wherein the at least one computer system transmits user interface instructions to the machine in response to receiving the first identifier, the second identifier, and a third identifier from the portable user device, the first, second and third identifiers identifying the fixed location, the application program, and a user profile associated with portable user device, respectively.

20. The system of claim 17, further comprising the portable user device.

21. The system of claim 17, wherein the machine is selected from the group consisting of a kiosk, a vending machine, and a digital sign.

22. The system of claim 17, wherein the application program is executable on the machine.

* * * * *